M. Eichholtz.
Cultivator.
No. 88,557. Patented Apr. 6, 1869.
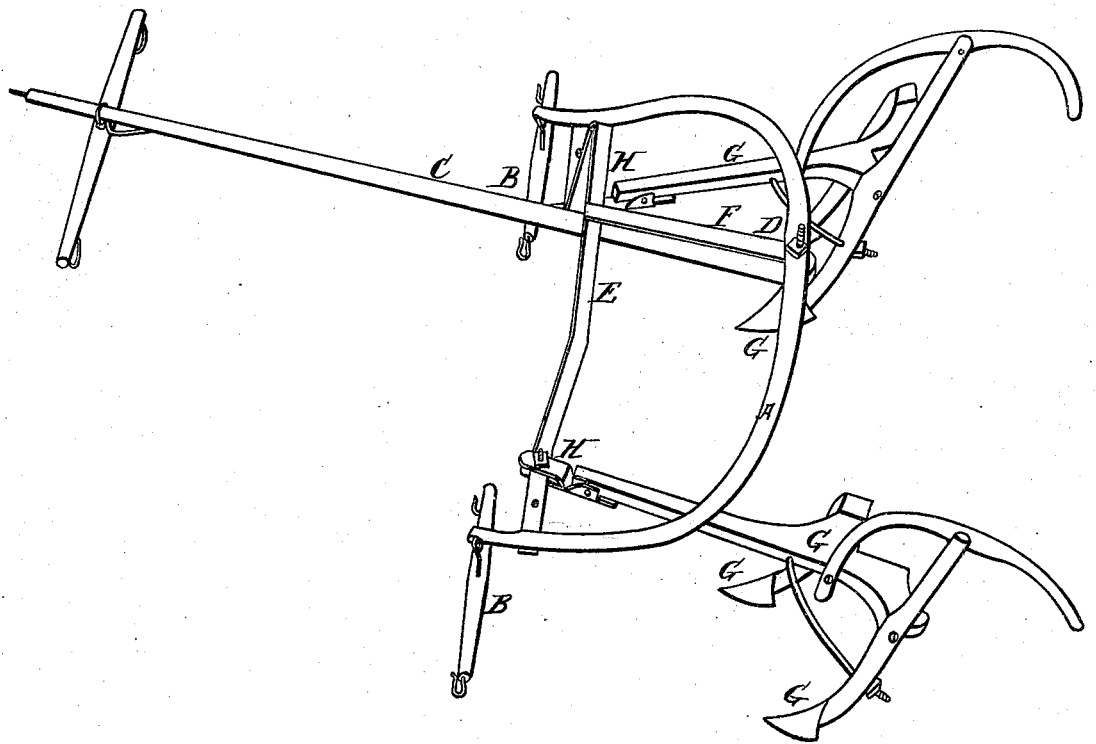
Witnesses,
H. F. Eberts
Lewis L. Gordon
Inventor,
Mathias Eichholtz
Per Attorney
Thos. S. Sprague

UNITED STATES PATENT OFFICE.

MATHIAS EICHHOLTZ, OF TROY, OHIO.

IMPROVEMENT IN EQUALIZING-CULTIVATORS.

Specification forming part of Letters Patent No. 88,557, dated April 6, 1869.

*To whom it may concern:*

Be it known that I, MATHIAS EICHHOLTZ, of Troy, in the county of Miami and State of Ohio, have invented a new and useful Improvement in Equalizing-Cultivators; and I do declare that the following is a true and accurate description thereof, reference being had to the accompanying drawings, and to the letters of reference marked thereon, and being a part of this specification.

The nature of this invention relates to an improvement in cultivators; and consists in attaching to a frame drawn by a pair of horses two plow-cultivators, in such a manner that two rows can be cultivated at once, and so arranged as to equalize the draft between the horses, compelling each to do his share of the work.

A in the drawings represents an arched metallic frame, to the ends of which are attached the whiffletrees B. C is the pole, attached underneath the center of the frame by a threaded swivel-bolt and nut, D, by raising and lowering which the depth of cultivation is regulated. E is a cross-beam of iron, bent at its central part, to pass over the pole C, and has its ends connected to the ends of the frame A. A bar or brace, F, extending from center to center of both frames, keeps them in their relative positions.

G are single plow-cultivators, attached by the swiveled clevises H to the horizontal ends of the cross-beam E, the ends of said beam being provided with several holes, in either of which the clevises may be attached, to enable the cultivators to operate in rows of different widths. The clevises permit the cultivators to be lifted over obstructions when necessary. This arrangement also permits the cultivators to be changed from side to side, as may be necessary, to throw the dirt to or from the hill.

It will readily be seen that each horse will be compelled to do his proportion of work, and that by means of the plow-handles attached to each cultivator it can be easily controlled and guided by the hand of the operator.

What I claim as my invention, and desire to secure by Letters Patent, is—

The frame A and the cross-beams E, connected together at their ends and by the brace F, the pole C, and adjustable swivel-bolt D, and the clevises H, in connection with a pair of single plow-cultivators, each drawn by one animal, and both animals guided by the pole C, substantially as described, and operating for the purposes specified.

MATHIAS EICHHOLTZ.

Witnesses:
    DAVIS BAIRD,
    W. F. ROSS.